(12) United States Patent
Rasch et al.

(10) Patent No.: US 11,287,024 B2
(45) Date of Patent: Mar. 29, 2022

(54) PULLEY DECOUPLER WITH DOUBLE PULLEY HUB

(71) Applicant: Schaeffler Technologies AG & Co. KG, Herzogenaurach (DE)

(72) Inventors: Philipp Rasch, Forst (DE); Alexander Rose, Baden-Baden (DE); Andreas Stuffer, Weingarten (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 217 days.

(21) Appl. No.: 16/324,704

(22) PCT Filed: Jul. 26, 2017

(86) PCT No.: PCT/DE2017/100625
§ 371 (c)(1),
(2) Date: Feb. 11, 2019

(87) PCT Pub. No.: WO2018/041293
PCT Pub. Date: Mar. 8, 2018

(65) Prior Publication Data
US 2019/0226570 A1 Jul. 25, 2019

(30) Foreign Application Priority Data
Aug. 30, 2016 (DE) .......................... 102016216274.8

(51) Int. Cl.
*F16H 55/36* (2006.01)
*F16F 15/123* (2006.01)

(52) U.S. Cl.
CPC ......... *F16H 55/36* (2013.01); *F16F 15/1232* (2013.01); *F16H 2055/366* (2013.01)

(58) Field of Classification Search
CPC .. F16H 2055/366; F16H 55/36; F16D 41/206; B60K 25/02; F02B 67/06
(Continued)

(56) References Cited

U.S. PATENT DOCUMENTS 2,092,571 A * 9/1937 Cole .................... F16F 15/1428
464/68.4
4,781,659 A * 11/1988 Gebhardt .............. F16F 15/136
474/903
(Continued)

FOREIGN PATENT DOCUMENTS

CN 1715706 A 1/2006
CN 102906441 A 1/2013
(Continued)

*Primary Examiner* — Henry Y Liu
(74) *Attorney, Agent, or Firm* — Lekeisha Suggs

(57) ABSTRACT

A pulley decoupler for a drive train of a motor vehicle is disclosed for eliminating or reducing rotation-related irregularities transmitted by a crankshaft. The pulley decoupler comprises a pulley hub, an arc spring flange, and a torsional vibration damper flange of a torsional vibration damper. In embodiments, the pulley hub, the arc spring flange, and the torsional vibration damper flange are configured to be non-rotatably mounted on a crankshaft by at least one crankshaft screw. The pulley hub has an outer lateral surface region on which both the torsional vibration damper flange and the arc spring flange are received and on which they are configured to be non-rotatably mounted.

14 Claims, 1 Drawing Sheet

(58) Field of Classification Search
USPC .................................................. 474/70, 94
See application file for complete search history.

(56) References Cited

U.S. PATENT DOCUMENTS

| | | | | |
|---|---|---|---|---|
| 5,445,049 A * | 8/1995 | Ullrich | ................. | F16F 15/126 |
| | | | | 267/141.3 |
| RE35,932 E * | 10/1998 | Cerny | ................. | F16F 15/126 |
| | | | | 474/135 |
| 5,988,015 A * | 11/1999 | Riu | ................. | F16F 15/124 |
| | | | | 74/574.2 |
| 6,044,943 A * | 4/2000 | Bytzek | ................. | F16F 15/123 |
| | | | | 192/41 R |
| 6,106,421 A * | 8/2000 | Graber | ................. | F16F 15/126 |
| | | | | 474/94 |
| 7,591,357 B2 * | 9/2009 | Antchak | ............... | F16D 41/206 |
| | | | | 192/41 S |
| 7,624,852 B2 * | 12/2009 | Mevissen | ............. | F16F 15/123 |
| | | | | 192/41 S |
| 8,038,554 B2 * | 10/2011 | Watanabe | ............. | F16F 15/126 |
| | | | | 474/94 |
| 8,302,753 B2 * | 11/2012 | Antchak | ................. | F16F 15/12 |
| | | | | 192/55.5 |
| 8,641,563 B2 * | 2/2014 | Mende | ................ | F16F 15/1297 |
| | | | | 474/94 |
| 8,789,670 B2 * | 7/2014 | Antchak | ................. | F16D 41/20 |
| | | | | 192/41 S |
| 10,024,415 B2 * | 7/2018 | Schneider | ............... | F16D 13/08 |
| 10,753,453 B2 * | 8/2020 | Cariccia | ................ | F16H 55/36 |
| 2009/0176608 A1* | 7/2009 | Jansen | .................. | F02B 67/06 |
| | | | | 474/74 |
| 2011/0263365 A1* | 10/2011 | Mende | ............... | F16F 15/1297 |
| | | | | 474/94 |
| 2011/0315502 A1* | 12/2011 | Antchak | ................ | F16D 43/24 |
| | | | | 192/75 |
| 2013/0087428 A1* | 4/2013 | Antchak | ............... | F16F 15/123 |
| | | | | 192/41 S |
| 2013/0098733 A1* | 4/2013 | Antchak | ................ | B60K 25/00 |
| | | | | 192/41 S |
| 2013/0217524 A1* | 8/2013 | Antchak | ............... | F16D 41/206 |
| | | | | 474/94 |
| 2014/0209428 A1* | 7/2014 | Dell | ................... | F16F 15/1232 |
| | | | | 192/89.26 |
| 2015/0041277 A1* | 2/2015 | Boyes | .................. | F16D 27/14 |
| | | | | 192/80 |
| 2015/0075943 A1* | 3/2015 | Williams | .................. | F16D 3/12 |
| | | | | 192/41 S |
| 2015/0252885 A1* | 9/2015 | Manzoor | .................. | F16F 7/12 |
| | | | | 474/148 |
| 2015/0260265 A1 | 9/2015 | Agnitch et al. | | |
| 2015/0316138 A1* | 11/2015 | Dell | ....................... | F16D 13/76 |
| | | | | 474/91 |
| 2015/0345610 A1* | 12/2015 | Mende | .................. | F16D 41/185 |
| | | | | 474/171 |
| 2016/0040733 A1* | 2/2016 | Staniewicz | ............ | B60K 25/02 |
| | | | | 701/67 |
| 2016/0053876 A1* | 2/2016 | Nakamura | ................ | F16D 3/78 |
| | | | | 474/166 |
| 2016/0069418 A1* | 3/2016 | Schneider | ........... | F16F 15/1442 |
| | | | | 188/380 |
| 2016/0091048 A1* | 3/2016 | Tran | ....................... | F02B 67/06 |
| | | | | 474/94 |
| 2016/0123453 A1* | 5/2016 | Starodoubov | ............ | F16D 3/66 |
| | | | | 474/94 |
| 2016/0138699 A1* | 5/2016 | Dell | ..................... | F16F 15/12346 |
| | | | | 474/94 |
| 2016/0146328 A1* | 5/2016 | Dell | ....................... | B60K 25/02 |
| | | | | 474/94 |
| 2016/0201757 A1* | 7/2016 | Tran | .................. | F16F 15/12353 |
| | | | | 474/94 |
| 2016/0333987 A1* | 11/2016 | Tran | ....................... | B60K 25/02 |
| 2017/0122425 A1* | 5/2017 | Schneider | ............... | F16H 55/36 |
| 2017/0248219 A1* | 8/2017 | Kvasnicka | ............. | F16H 55/36 |
| 2018/0045288 A1* | 2/2018 | Cariccia | ............... | F16F 15/123 |
| 2018/0051792 A1* | 2/2018 | Cariccia | ............... | F16F 15/123 |
| 2018/0163788 A1* | 6/2018 | Dell | ........................ | F16D 3/12 |

FOREIGN PATENT DOCUMENTS

| | | |
|---|---|---|
| CN | 103210226 A | 7/2013 |
| CN | 103671701 A | 3/2014 |
| CN | 104653751 A | 5/2015 |
| CN | 105020368 A | 11/2015 |
| CN | 105074282 A | 11/2015 |
| CN | 105229325 A | 1/2016 |
| DE | 2827014 A1 | 1/1980 |
| DE | 19652730 A1 | 6/1997 |
| DE | 102009039989 A1 | 4/2010 |
| DE | 102013224327 A1 | 6/2014 |
| DE | 102014201858 A1 | 8/2014 |
| DE | 102015205247 A1 | 10/2015 |
| DE | 102015205612 B3 | 12/2015 |
| EP | 2827014 A1 | 1/2015 |
| FR | 2963399 A1 | 2/2012 |
| JP | 2010144892 A | 7/2010 |
| JP | 5318798 B2 | 10/2013 |
| WO | 2011127898 A1 | 10/2011 |
| WO | 2011160215 A1 | 12/2011 |
| WO | 2014117261 A1 | 8/2014 |
| WO | 2015103697 A1 | 7/2015 |

* cited by examiner

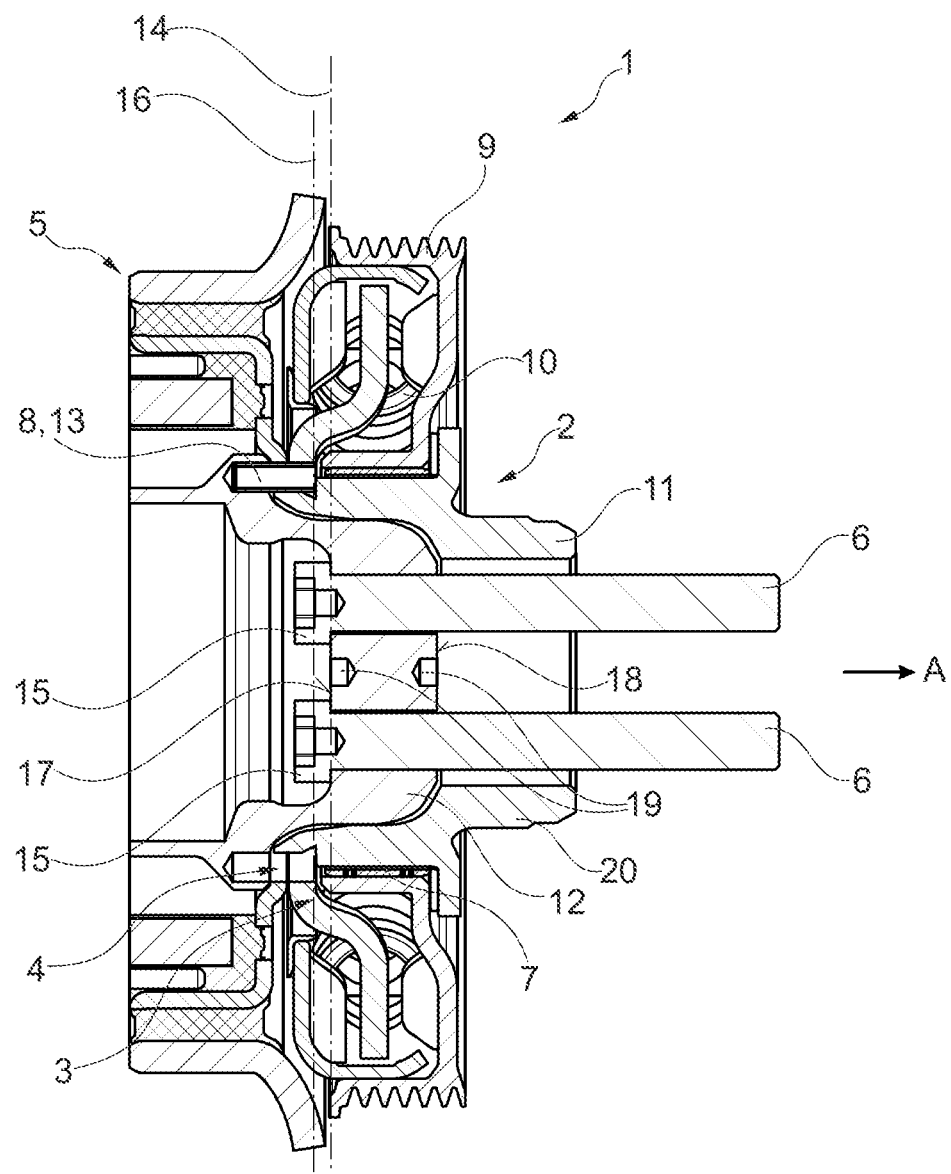

PULLEY DECOUPLER WITH DOUBLE PULLEY HUB

CROSS-REFERENCE TO RELATED APPLICATIONS

This application is the U.S. National Phase of PCT Appln. No. PCT/DE2017/100625 filed Jul. 26, 2017, which claims priority to DE 10 2016 216 274.8 filed Aug. 30, 2016, the entire disclosures of which are incorporated by reference herein.

TECHNICAL FIELD

The present disclosure relates to a pulley decoupler for a drive train of a motor vehicle to eliminate or mitigate rotation-related irregularities transmitted by a crankshaft.

BACKGROUND

EP 2 827 014 A1 discloses a pulley decoupler which is prepared for fastening on a crankshaft. In this case, the pulley of the pulley decoupler is arranged in such a way that the angle of rotation thereof relative to the crankshaft and to a torsional vibration damper can be changed. The torsional vibration damper is positioned partially in a corresponding annular recess in the pulley, thereby giving rise to an annular cavity in the recess between the torsional vibration damper and the pulley. An annular sealing ring is positioned in the annular cavity and is arranged in such a way that at least part of the annular cavity is closed off from the air surrounding the assembly.

The pulley decoupler disclosed herein is of serial construction. This means that a hub, an arc spring flange and a torsional vibration damper flange are situated directly adjacent to one another. The abovementioned parts are fastened on the crankshaft by means of crankshaft screws. The plane of the contact surface for the heads of the crankshaft screws is thus obtained from the sum of the widths of all the components in the axial direction. Owing to the fact that a certain minimum width is necessary for all the components by virtue of the design, a certain minimum distance from the crankshaft also applies to the bearing surface of the crankshaft screw. As a result, it is no longer possible under certain circumstances to use the previous crankshaft screws. However, since the crankshaft screws used for different drive trains are generally common parts, this is a considerable disadvantage of the concept and can give rise to higher costs.

SUMMARY

It is the object of the present disclosure to avoid or at least mitigate the disadvantages of the prior art and, in particular, to make available a pulley decoupler which allows the use of crankshaft screws as common parts for different drive trains.

The object of the present disclosure is achieved, in the case of a pulley decoupler of the type in question, by virtue of the fact that the pulley hub has an outer lateral surface region, on which both the torsional vibration damper flange and the arc spring flange are received, on the one hand, and on which they are or can be non-rotatably mounted or fastened, on the other hand.

Thus, it is advantageous if the pulley hub is of multipart design, i.e. is constructed from a plurality of separate components. The pulley hub can thereby be adapted individually to the requirements of the different drive trains without necessarily changing the position for the arc spring flange and/or the torsional vibration damper flange.

It has proven particularly advantageous for this purpose if the pulley hub has a crankshaft-side first hub, into which a second hub, which is adjacent to or faces the torsional vibration damper and has at least one mounting pin, preferably separate from said second hub, is inserted, preferably coaxially. It is thereby possible to position the contact surface for screw heads of the crankshaft screws closer to the crankshaft and thus to enable the use of the same crankshaft screws in different drive trains.

It is advantageous here if the mounting pin is designed as a hollow bolt. A hollow bolt has the necessary stability and is lighter than a solid bolt, thereby making it possible to save weight.

It is also advantageous if the arc spring flange and the torsional vibration damper flange are pre-mounted on the second hub with the aid of the mounting pin. The flanges are thereby already radially pre-positioned but still capable of (free) axial movement. The axial movement is restricted only by the second hub. Thus, the mounting pin also serves as a securing means during transportation and can therefore also be referred to as a positioning or transportation securing pin.

It is also advantageous if the second hub has an end face which faces the torsional vibration damper and is in direct contact with the screw head of the crankshaft screw, and/or the second hub has a crankshaft-side end face which can be brought into direct contact with the crankshaft. Through the use of a second hub, it is thus also possible to dispense with a separate component as a contact surface for the screw heads of the crankshaft screws.

It is furthermore advantageous if the first hub is designed to surround a piece of the crankshaft. The mounting process for mounting the pulley decoupler on the crankshaft is thereby simplified.

It has proven particularly advantageous for this purpose if there is an interference fit/press fit between the first hub and the second hub. It is thereby possible to dispense with further parts for the (non-rotatable) connection of the first hub to the second hub.

It is also advantageous if the crankshaft-side end face of the second hub is arranged on the crankshaft side of the section of the arc spring flange which is closest to the crankshaft when viewed in the axial direction.

An advantageous embodiment discloses that the at least one screw head of the crankshaft screw lies in the same plane, or on the crankshaft side thereof, as a plane through the contact region between the mounting pin and the arc spring flange.

In other words, the present disclosure consists in that a pulley decoupler which uses an additional hub is made available. This hub is press-fitted into the original hub and, during this process, clamps the arc spring flange and the torsional vibration damper flange on the outside diameter.

It can also be stated that, in a pulley decoupler according to the present disclosure, the arc spring flange and the torsional vibration damper flange rest axially one upon the other. The axial length and minimum distance from the crankshaft of the crankshaft screws is determined thereby. To enable crankshaft screws to be used as common parts for different engines here, an additional hub is used. There is freedom of choice here in the axial dimension of the additional hub. Said hub is inserted with an interference into the original hub and simultaneously serves as a securing means for transportation, thereby making it possible to replace the usual rivet as a securing means for transportation.

The second/additional hub clamps the arc spring flange and the torsional vibration damper flange on the outside diameter. A friction coefficient and a clamping force are unchanged as compared with the prior art but clamping takes place over a larger diameter (radially further out), thus allowing a higher torque to be transmitted. The non-rotatable connection between the hub and the flanges is achieved here by virtue of the fact that a preloading force which is produced through mounting on the crankshaft by means of the crankshaft screws presses the two hubs together in such a way that the flanges are clamped between the two hubs.

As an alternative, the pulley decoupler can also have just one pulley hub, on the lateral surface of which the torsional vibration damper flange and the arc spring flange are non-rotatably mounted. In this case, the torsional vibration damper flange and the arc spring flange can be fastened on the pulley hub by means of a press fit on the mounting pin. By means of a press fit, it is possible to dispense with further fastening or connection components to connect the flanges non-rotatably to the pulley hub.

BRIEF DESCRIPTION OF THE DRAWINGS

The present disclosure is explained in greater detail below with the aid of a FIGURE, in which an illustrative embodiment is shown. Here:

The single FIGURE shows a longitudinal section through a pulley decoupler according to an embodiment of the present disclosure.

The FIGURE is of a purely schematic nature and serves merely for the comprehension of the present disclosure. Identical elements are provided with the same reference signs.

DETAILED DESCRIPTION

The FIGURE shows a pulley decoupler 1, which has a pulley hub 2, which can be fastened on a crankshaft (not shown) together with an arc spring flange 3 and a torsional vibration damper flange 4 of a torsional vibration damper 5 by means of at least two, preferably four, crankshaft screws 6. For this purpose, the arc spring flange 3 and the torsional vibration damper flange 4 are mounted non-rotatably on an outer lateral surface region 7 of the pulley hub 2 or are positioned/mounted there in such a way with the aid of a mounting pin 8 that they can be connected non-rotatably to the pulley hub, at least in operation.

The pulley decoupler 1 comprises the torsional vibration damper 5, a pulley 9 and an arc spring 10, which is arranged radially within the pulley 9. The torsional vibration damper 5 and the arc spring 10 are connected to the pulley hub 2 via the corresponding flanges 3 and 4, respectively. The pulley hub 2 is connected non-rotatably to the pulley 9, e.g. by means of a conventional shaft-hub connection.

The pulley hub 2 of the illustrative embodiment shown here is constructed from a first hub 11 and a second hub 12. The first hub 11 is oriented on the crankshaft side, and the second hub 12 faces the torsional vibration damper 5 and is inserted coaxially, radially within the first hub 11. In the illustrative embodiment shown here, a non-rotatable connection between the first hub 11 and the second hub 12 is achieved by means of an interference fit or press fit. That is to say that the second hub 12 is mounted within the first hub 11 in such a way as to be non-rotatable relative to the latter by means of a press fit. Thus, no further elements are required in order to connect the two hubs 11, 12 to one another.

Here, the fastening of the torsional vibration damper 5 and the arc spring 10 by means of the torsional vibration damper flange 4 and the arc spring flange 3, respectively, is achieved by means of a separate mounting pin 8, which is designed as a hollow bolt 13.

By using two nested hubs 11, 12, it is possible to structurally decouple the plane 14 in which the contact surface for screw heads 15 of the crankshaft screw 6 lies from the minimum widths of the flanges 3, 4 and of the pulley hub 2. It is thus possible to place the screw head 15 of the crankshaft screw 6 in the same plane as a plane 16 which passes through the contact region between the mounting pin 8 and the arc spring flange 3 or is even arranged on the crankshaft side thereof (as shown in the FIGURE). Furthermore, it is thereby possible to position the contact surface for the screw head 15, or a receiving region for the crankshaft screw 6 on the pulley hub 2, radially further in than the two flanges 3, 4.

Another feature of the embodiment shown in the FIGURE is that the second hub 12 has an end face 17 which is in direct contact with the screw head 15 of the crankshaft screw 6. Thus, it is possible, as compared with the prior art, to dispense with a separate component as a contact surface for the screw head 15 of the crankshaft screw 6. Furthermore, the second hub 12 has, as an optional alternative or additional feature, an end face 18 which can be brought into direct contact with the crankshaft (not shown here).

In the illustrative embodiment shown here, the second hub 12 has recesses 19 centrally positioned on the end faces 17, 18 thereof, it being possible for said recesses to be used to receive securing means for transportation, for example.

The first hub 11 has an encircling projection 20 which, when the pulley decoupler 1 is mounted on the crankshaft (not shown), is used to surround a section of the crankshaft along the axial direction. This simplifies the mounting process for the connection of the pulley decoupler 1 to the crankshaft.

It can be seen from the FIGURE that the crankshaft-side end face 18 of the second hub 12 is arranged on the crankshaft side of that section of the arc spring flange 3 which is closest to the crankshaft, when viewed in the axial direction A.

The arc spring flange 3 and the torsional vibration damper flange 4 are fastened on the second hub 12 by means of the mounting pin 8. As an alternative, it is also possible for the flanges 3, 4 to be fastened by means of screws as mounting pins, whereby they are already connected non-rotatably to the second hub 12 via the mounting pin. In this case, it is possible to dispense with the application of pressure to the two hubs 11, 12 by means of the preloading force produced during mounting on the crankshaft. In such a case, therefore, it is possible to dispense with the multipart embodiment of the pulley hub 2 as embodied in the illustrative embodiment shown in the FIGURE.

Through the shifting of the fastening location of the arc spring flange 3 and of the torsional vibration damper flange 4 from virtually the center of the hub (within the pulley hub 2) to a radially outer region of the pulley hub 2, namely the lateral surface 7, the clamping radius, i.e. the radius (or diameter) on which clamping takes place, is enlarged, thus making it possible to transmit a higher torque with an unchanged friction coefficient and an unchanged clamping force.

LIST OF REFERENCE SIGNS 1 pulley decoupler
2 pulley hub
3 arc spring flange
4 torsional vibration damper flange
5 torsional vibration damper
6 crankshaft screw
7 lateral surface
8 mounting pin
9 pulley
10 arc spring
11 first hub
12 second hub
13 hollow bolt
14 plane
15 screw head
16 plane
17 end face
18 end face
19 recesses
20 projection
A axial direction

The invention claimed is:

1. A pulley decoupler for a drive train of a motor vehicle to eliminate or reduce rotation-related irregularities transmitted by a crankshaft, comprising:
a pulley hub;
an arc spring flange; and
a torsional vibration damper flange of a torsional vibration damper, wherein the pulley hub, the arc spring flange, and the torsional vibration damper flange are configured to be non-rotatably mounted on a crankshaft by at least one crankshaft screw, wherein the pulley hub has an outer lateral surface region on which both the torsional vibration damper flange and the arc spring flange are received and on which they are configured to be non-rotatably mounted, wherein the pulley hub includes a first hub on a crankshaft side and a second hub inserted coaxially radially within the first hub, wherein there is an interference fit between the first hub and the second hub.

2. The pulley decoupler as claimed in claim 1, wherein the pulley hub is of multipart design.

3. The pulley decoupler as claimed in claim 1, wherein the second hub is adjacent to the torsional vibration damper and has at least one mounting pin.

4. The pulley decoupler as claimed in claim 3, wherein the arc spring flange and the torsional vibration damper flange are pre-mounted on the second hub using the mounting pin.

5. The pulley decoupler as claimed in claim 3, wherein the mounting pin is designed as a hollow bolt.

6. The pulley decoupler as claimed in claim 3, wherein the second hub has an end face which faces the torsional vibration damper and is in direct contact with a screw head of the crankshaft screw, and/or the second hub has a crankshaft-side end face configured to directly contact the crankshaft.

7. The pulley decoupler as claimed in claim 3, wherein the first hub is arranged to surround a piece of the crankshaft.

8. The pulley decoupler as claimed in claim 6, wherein the crankshaft-side end face of the second hub is arranged on a crankshaft side of a section of the arc spring flange which is closest to the crankshaft when viewed in an axial direction (A).

9. The pulley decoupler as claimed in claim 6, wherein the screw head of the crankshaft screw lies in a same plane, or on the crankshaft side thereof, as a plane through a contact region between the mounting pin and the arc spring flange.

10. A pulley decoupler for a drive train of a motor vehicle, comprising:
a pulley;
an arc spring disposed radially within the pulley and including a first flange;
a torsional vibration damper including a second flange; and
a pulley hub non-rotatably connected to the pulley and configured for coupling to a crankshaft via a crankshaft screw, the pulley further comprising:
a first hub aligned on a crankshaft side; and
a second hub mounted coaxially, radially within the first hub and arranged to face the torsional vibration damper,
wherein the arc spring and the torsional vibration damper are connected to the pulley hub on an outside diameter thereof by the first and the second flanges, respectively;
wherein the second hub is mounted within the first hub by a press fit such that the second hub is non-rotatable relative to the first hub.

11. The pulley decoupler of claim 10, wherein the second hub has a first end face in direct contact with a screw head of the crankshaft screw.

12. The pulley decoupler of claim 11, wherein the second hub has a second end face, axially opposite the first end face, configured to directly contact the crankshaft.

13. The pulley decoupler of claim 10, wherein the first and the second flanges are connected to the pulley hub via a fastener.

14. The pulley decoupler of claim 13, wherein a screw head of the crankshaft screw lies in a same plane as a plane passing through a contact region between the fastener and the first flange.

* * * * *